United States Patent [19]
Bey et al.

[11] 3,856,417
[45] Dec. 24, 1974

[54] PHOTOGRAPHIC COLOR DENSITOMETER

[76] Inventors: Paul P. Bey; Michael P. Bey, both of 4909 Abbot Dr., Temple Hills, Md. 20031

[22] Filed: Nov. 30, 1971

[21] Appl. No.: 203,282

[52] U.S. Cl. ................ 356/229, 356/179, 356/202, 356/226
[51] Int. Cl. ............................................. G01j 1/10
[58] Field of Search ........... 356/175, 177, 179, 195, 356/173, 201, 202, 204, 229, 226; 250/206

[56] References Cited
UNITED STATES PATENTS
3,653,763  4/1972  Davies .............................. 356/202

*Primary Examiner*—John K. Corbin
*Assistant Examiner*—Conrad Clark

[57] ABSTRACT

A photometric device for measuring the differences in primary color optical densities between spectrally neutral areas of a standard photographic color negative and a color negative to be printed. These density measurements determine the densities of proper color compensating filters required for photographic color printing. Memory voltages are provided which are proportional to the intensities of the primary colors transmitted through a spectrally neutral area of a standard color negative and standard filter pack. Light, transmitted through a spectrally neutral area of a color negative to be printed and sequentially selected primary color filters, is incident on a photodetector. The resulting photocurrents sequentially generate voltages across an amplifier variable load resistor, which is adjusted for each of the primary colors so that the voltage developed across it is equal to the corresponding memory voltage as indicated by a null detector. The variable load resistor is calibrated to read optical density and indicates the proper filter compensation for the photographic color negative to be printed.

10 Claims, 1 Drawing Figure

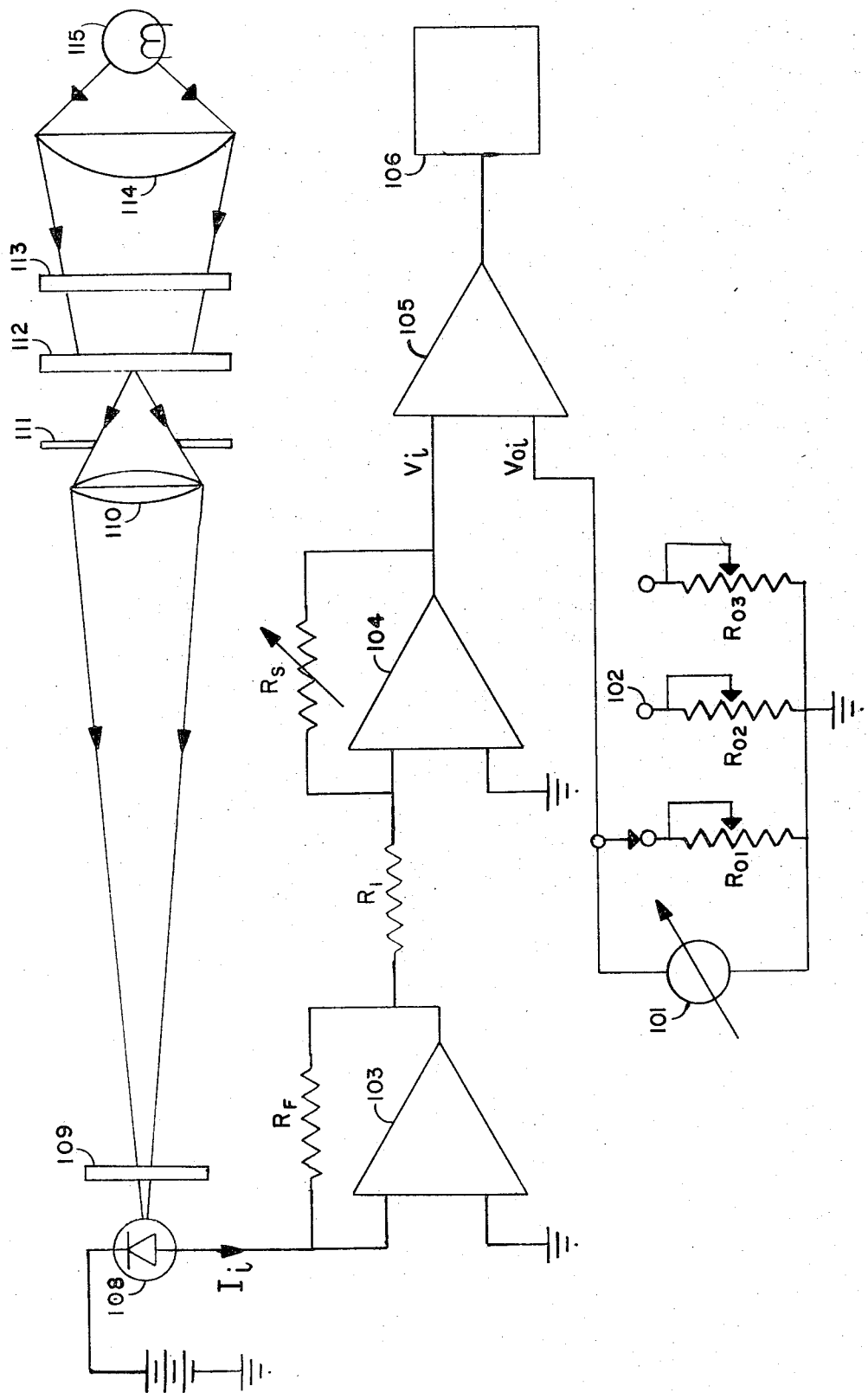

PHOTOGRAPHIC COLOR DENSITOMETER

BACKGROUND OF THE INVENTION

The present invention relates to a photometric device, and specfically to one which provides means for accurately and rapidly measuring the optical density of color compensating filters required for obtaining a color balance of a photographic color negative to be printed. The major drawback in the prior art has been that most devices for photographic color printing utilize ammeters and the like to indicate optical densities. Meter drift introduces uncertainty as well as a time delay in measurements. In addition, the cost of manufacture is higher since an accurate, expensive meter is required to obtain the necessary accuracy of measurement.

Considering the drawbacks of the prior art, we have developed an economical instrument capable of accurately and rapidly measuring the optical densities of color compensating filters required to obtain a color balance of a photographic color negative to be printed by utilizing among other things, memory voltages, voltages developed across a density calibrated amplifier load resistor proportional to the intensity of light incident on a photodetector, a difference amplifier and null detector.

SUMMARY OF THE INVENTION

Primary color components of white light transmitted through a spectrally neutral area of a standard photographic color negative and standard filter pack are sequentially selected by optical filters. The filtered light is incident on the cathode of a photodetector and the photocurrents corresponding to the three primary colors generate voltages across a standard resistive component of an amplifier variable load resistor proportional to the intensity of light incident on the photodetector cathode. Current, generated by a current generator, is sequentially switched through memory load resistors corresponding to the primary colors. The voltages developed across the standard resistive component of the amplifier variable load resistor and the memory load resistors are applied to the input of a difference amplifier, the output of which is connected to a null detector. Each memory load resistor is adjusted until a null is indicated. Thus, the memory voltages corresponding to the null indications are proportional to the intensities of light for the primary colors transmitted through the standard filter pack and spectrally neutral area of the standard photographic color negative. The procedure just described serves to calibrate the device.

To determine the color compensation for a color negative to be printed, the negative is inserted in the negative holder and the compensating filters are removed. The red color selecting filter and corresponding memory resistor are selected. The red component of white light transmitted through a spectrally neutral area of the color negative is incident on the photodetector cathode. Current generated by the current generator or enlarger aperture is adjusted so that the voltage developed across the memory load resistor is equal to the voltage generated by the photodetector current across the standard resistive component of the variable load resistor as indicated by the null detector. Green and blue filters and corresponding memory load resistors are then selected and the variable load resistor is adjusted until a null indication is observed. The scale of the variable load resistor is calibrated to read optical density and the density indications correspond to the optical density of color compensating filters required to be added or subtracted in order to obtain a color balance of the color negative to be printed.

OBJECTS OF THE INVENTION

It is therefore an object of the present invention to detect and indicate differences in optical density between a photographic color negative to be printed and a selected photographic color negative for the primary colors.

A further object of the present invention is to determine density differences between a photographic color negative to be printed and a standard photographic color negative without regard to the specific value of their individual densities.

Another object of the invention is to store relative resistive values proportional to the relative intensities of the primary colors transmitted through a standard filter pack and a spectrally neutral area of a standard photographic color negative.

Another object of the invention is to provide density difference information as a ratio so that parameters such as photodetector sensitivity, memory current and light intensity do not affect the ratio.

Other objects and advantages will become readily apparent to those skilled in the art after an understanding of this specification and the accompanying drawing.

DRAWINGS

The FIGURE is a schematic diagram of an apparatus embodying the elements of the invention.

DETAILED DESCRIPTION

Referring to the drawing, a standard photographic color negative is inserted in the negative holder 112 and color compensating filters (referred to as the standard filter pack), which provides a good color print, are placed in the filter drawer 113 located adjacent to the condenser lens 114. Primary color components of the white light source 115 transmitted through a spectrally neutral area of the standard color negative and standard filter pack are sequentially selected by optical filters 109. The filtered light, focused by the objective lens 110, is incident on the photocathode of the photodetector 108 comprising a photomultiplier or linear solid state detector such as a PIN diode. The photocurrents $I_i = I_i^{ref}$ amplified by amplifiers 103 and 104 generate voltages $V_i = V_i^{ref}$ across the calibrated variable load resistor 106 designated as $R_s$ ($i = 1, 2, 3$ corresponding to red, green and blue color selecting filters, respectively) proportional to the product of $I_i^{ref}$ and $R_s$ with $R_s$ equal to $R_s^{std}$, where $R_s^{std}$ is a specific fraction of $R_s$. The photocurrents $I_i^{ref}$ are proportional to the light intensity incident on the photodetector and thus, the voltages $V_i^{ref}$ are proportional to the primary color intensities incident on the photodetector. The resistor $R_s$ is calibrated so that its scale readings $D_i^s$ for $R_s = R_{si}$ are:

$$D_i^s = \text{Log}_{10}(R_{si}/R_s^{std}) \quad R_{si} > R_s^{std}$$

(1)

$$D_i{}^s = \text{Log}_{10}(R_s{}^{std}/R_{si}) \quad R_{si} < R_s{}^{std}.$$

Current $I_o$, generated by the current generator 101, is switched through selected variable memory load resistors 102. Memory voltages $V_{oi} = I_o R_{oi}$ and photodetector voltages $V_i$ are applied to the input terminals of the difference amplifier 105. For a selected current $I_o = I_o{}^{ref}$, the memory load resistors $R_{oi}$ are adjusted so that $V_{oi} = V_{oi}{}^{ref} = V_i{}^{ref}$. This condition is obtained when the output of the difference amplifier is equal to zero which is indicated by the null detector 106. Thus, the memory voltages $V_{oi}{}^{ref}$ are proportional to the intensities of the primary colors transmitted through the standard filter pack and spectrally neutral area of the standard color negative.

The procedure described above serves to calibrate the device. To determine the proper compensating filter densities for a color negative to be printed, the negative is inserted in the negative holder and measurements are made with no compensating filters in the filter drawer. The red selecting filter is selected and $R_s$ adjusted so that $R_s = R_{s1} = R_s{}^{std}$. Current $I_o$ is adjusted or the light intensity incident on the photodetector is varied by adjustment of the aperture 111 so that $V_1 = V_{01}$ as indicated by the null detector. When a null indication is obtained, $R_s = R_{s1} = R_s{}^{std}$, $I_o = C_1 I_o{}^{ref}$ and $I = C_2 I^{ref}$, where $C_1$ and $C_2$ are constants and $I$ and $I^{ref}$ are the intensities of white light transmitted to the detector as determined by the aperture stop for the color negative to be printed and the standard color negative, respectively.

The voltage and current relationships corresponding to null indications for the standard color negative and the color negative to be printed are, respectively, $$V_i = V_i{}^{ref} = I_o{}^{ref} R_{oi} = V_{oi}{}^{ref} \tag{2}$$

and $$V_i = V_{oi} = I_{oi} R_{oi} = V_{oi}{}^{ref} C_1. \tag{2a}$$

The respective voltages are related to the light intensities and optical transmissions by the equations, $$V_i = I^{ref} T_i{}^{ref} T_i k_i R_s{}^{std} \tag{3}$$

and $$V_i = I T_i T_i k_i R_{si} = I^{ref} T_i{}^{ref} T_i k_i R_{si} C_2, \tag{3a}$$

where $T_i$ are the optical transmissions of the color selecting filters, $T_i$ are the optical transmissions through the spectrally neutral area of the color negative to be printed, $T_i{}^{ref}$ are the optical transmissions through the standard filter pack and spectrally neutral area of the standard color negative and $k_i$ are the combined sensitivities of the photodetector and amplifier.

The conditions for a null are from Eqs. (2), (2a), (3) and (3a) accordingly, $$R_{si}/R_s{}^{std} = C_1 T_i{}^{ref}/C_2 T_i. \tag{4}$$

The necessary condition to obtain a color balance for the negative to be printed is, $$I_1/I_1{}^{ref} = I_2/I_2{}^{ref} = I_3/I_3{}^{ref}, \tag{5}$$

where $I_i$ are the primary color intensities of light transmitted through the spectrally neutral area of the color negative to be printed and $I_i{}^{ref}$ are the primary color intensities of light transmitted through the standard filter pack and spectrally neutral area of the standard color negative. Since $I_i = T_i T_i I$ and $I_i{}^{ref} = T_i T_i{}^{ref} I^{ref}$, the condition for color balance (Eq. (5)) becomes, $$T_1/T_1{}^{ref} = T_2/T_2{}^{ref} = T_3/T_3{}^{ref} \tag{6}$$

Two cases are considered for determining the optical density correction for the green absorbing filter:

A. If $T_1/T_1{}^{ref} < T_2/T_2{}^{ref}$ ($R_{s2} < R_s{}^{std}$ from Eq. (4)), then a compensating filter of optical density $D_2{}^F$ and optical transmission $T_2{}^F$ must be added in order that $$T_2 T_2{}^F / T_2{}^{ref} = T_1/T_1{}^{ref} \tag{7}$$

or since the optical density $D_i$ is equal to $\text{Log}_{10}(1/T_i)$, $$D_2{}^F = D_2{}^{ref} - D_2 + D_1 - D_1{}^{ref}. \tag{8}$$

B. If $T_1/T_1{}^{ref} > T_2/T_2{}^{ref}$ ($R_{s2} > R_s{}^{std}$ from Eq. (4)), then a compensating filter of optical density $D_2{}^F$ and optical transmission $T_2{}^F$ must be subtracted such that $$T_2/T_2{}^{ref} T_2{}^F = T_1/T_1{}^{ref} \tag{9}$$

or, $$D_2{}^F = D_2 - D_2{}^{ref} + D_1{}^{ref} - D_1. \tag{10}$$

We have previously selected $R_{s1} = R_s{}^{std}$ for the red balance condition and therefore, from Eqs. (1) and (4), $$D_1{}^s = 0 = D_1 - D_1{}^{ref} + \text{Log}_{10}(C_2/C_1), \tag{11a}$$

or, $$\text{Log}_{10}(C_2/C_1) = D_1{}^{ref} - D_1. \tag{11b}$$

The null condition for the measured negative in the case of the green absorbing filter is obtained when $R_{s2}$ is adjusted so that Eq. (4) is satisfied and then for the two cases previously considered:

A. For $R_{s2} < R_s{}^{std}$, $$D_2{}^s = \text{Log}_{10}(R_s{}^{std}/R_{s2}) = D_2{}^{ref} - D_2 - \text{Log}_{10}(C_1/C_2) \tag{12}$$

from Eqs. (1) and (4). Substituting Eq. (11b) into Eq. (12), $$D_2{}^s = D_2{}^{ref} - D_2 + D_1 - D_1{}^{ref}. \tag{13}$$

Thus, in accordance with Eq. (8), the scale reads the optical density of the green absorbing compensating filter to be added for a color balance of the measured negative.

B. For $R_{s2} > R_s^{std}$, $$D_2^s = \text{Log}_{10}(R_{s2}/R_s^{std}) = D_2 - D_2^{ref} + D_1^{ref} - D_1$$

(14)

from Eqs. (1), (4) and (11b). Thus, in accordance with Eq. (10), the scale reads the optical density of the green absorbing compensating filter to be subtracted for a color balance of the measured negative.

The same procedure is used to determine the optical density of the filter $D_3^F$ to add or subtract for the blue absorbing compensating filter.

It is believed that the inventive method and apparatus has been described with sufficient detail to enable one skilled in the art to practice the teachings contained herein. It is anticipated that structural variations as well as electronic circuit equivalents may occur to those skilled in the art without there arising a departure from the spirit and scope of this invention.

What is claimed and desired to be secured by Letters Patent is:

1. A photometric device for determining a difference in optical density between a standard optical absorber and an unknown optical absorber comprising:
    a light source for generating light of a particular intensity;
    optical compensating filters placed in the optical path of said light source to modify the spectral distribution of said light source;
    optical absorbers comprising alternately a standard reference and unknown absorber placed in the optical path of said light source;
    Means for supporting a plurality of spectral selecting filters for passing selected spectral components of light passing through said compensating filters and said optical absorbers;
    detector means in proximity to said spectral selecting filters for providing detector currents proportional to the intensity of said spectral components incident on said detector means;
    voltage generating means comprising a first operational amplifier means for producing a voltage proportional to said detector currents;
    second operational amplifier means coupled to said first operational amplifier means in series with a variable resistive feedback means generating signal voltages proportional to said detector currents and resistance of said variable resistive feedback means;
    density calibration means coupled to said variable resistive means for displaying the difference in optical density between a known and unknown optical absorber;
    memory standard means for generating selectable standard reference voltages wherein each selectable voltage corresponds to an individual spectral component of light having passed through said standard optical absorber;
    voltage comparing means comprising a difference amplifier coupled to said second operational amplifier means and to said memory standard means producing a null voltage when said memory reference voltage is equal to said representative signal voltage corresponding to a particular resistance of said resistive feedback means;
    indicating means coupled to said voltage comparing means for providing an indication when said representative signal voltage and said reference memory voltage are equal.

2. The device as claimed in claim 1 wherein said proportional current is designated as $I_i$, and the voltage generating means comprises an amplifying means including resistors designated as $R_f$ and $R_1$, and said variable resistive means is an adjustable resistor $R_s$, and said memory standard means comprises a current source and a multitude of resistors to produce said selectable voltage designated as $V_{oi}$ wherein said comparing means provides a comparison between $V_{oi}$ and $$V_i = I_i R_s R_f / R_i,$$

where $V_i$ is said specific voltage.

3. The device as claimed in claim 1 wherein said density calibration means of said variable resistive means comprises a scale calibrated to read $$\text{Log}_{10}(R_s/R_s^{std}),$$

when $R_s$ is greater than $R_s^{std}$ and $$\text{Log}_{10}(R_s^{std}/R_s)$$

when $R_s$ is less than $R_s^{std}$ wherein said variable resistive means is designated as $R_s$ and $R_s^{std}$ is equal to said particular resistance.

4. The device as claimed in claim 1 wherein said detector means comprises a linear detector such as a photomultiplier or a solid state PIN diode.

5. The device according to claim 1 wherein said memory standard means comprises a plurality of selectable variable resistors and a current source for providing a current of a particular but adjustable level and means for selectively connecting said current source to selected ones of said variable resistors to thereby generate said memory voltages.

6. A photometric device for determining the proper densities of a color compensating filter pack required to obtain color balance for a color negative to be printed comprising:
    a. light source means and optical coupling means for generating light of a predetermined intensity along a predetermined optical path;
    b. means for supporting a color compensating filter pack in the optical path of said light source;
    c. means for supporting a color negative in said optical path;
    d. means for supporting a plurality of selectable filters in said optical path for passing selected spectral components of light generated by said light source;
    e. detector means for generating a detector current proportional to the intensity of said selected spectral components of light generated by said source;
    f. voltage generating means coupled to said detector means for producing color representative voltages proportional to said detector current for said selected spectral components;
    g. memory standard means for generating selectable color reference voltages corresponding to said color representative voltages generated by the selected spectral components of light which have passed through a spectrally neutral area of a standard color negative and a standard filter pack disposed in said optical path;
    h. voltage comparing means coupled to said voltage generating means and said memory standard means for determining when said color representative voltages are equal to the corresponding reference voltages generated by said memory standard means;

i. means for indicating when the compared voltages are equal;

j. means for adjusting said color representative voltages to values equal to said color reference voltages, said color representative voltage being adjusted for each selected spectral component with the standard color filter pack removed from said optical path and the light from said source passing through a spectrally netural area of the color negative to be printed, said adjusting means including a scale thereon for indicating the densities of said proper compensating filter pack required to obtain color balance for the color negative to be printed.

7. The device according to claim 6 wherein said selectable filters comprise red, green, and blue filters.

8. The device according to claim 6 wherein said memory standard means comprises a plurality of selectable variable resistors and a current source for providing a current of a particular but adjustable level and means for selectively connecting said current source to selected ones of said variable resistors to thereby generate said memory voltages.

9. The device according to claim 6 wherein said means for adjusting said color representative voltages comprises a variable resistor in the feedback path of an operational amplifier connected between said voltage generating means and said voltage comparing means.

10. The device according to claim 9 wherein an adjustable aperture means is provided in said optical path for varying the intensity of light transmitted to said detector means.

* * * * *